United States Patent
Zafiris et al.

(10) Patent No.: US 11,518,652 B2
(45) Date of Patent: Dec. 6, 2022

(54) LOAD BEARING MEMBER FOR AN ELEVATOR SYSTEM HAVING AN ELASTOMER AND PHOSPHONATE BLENDED BONDING AGENT

(71) Applicant: Otis Elevator Company, Farmington, CT (US)

(72) Inventors: Georgios S. Zafiris, Glastonbury, CT (US); Scott A. Eastman, Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/200,248

(22) Filed: Mar. 12, 2021

(65) Prior Publication Data

US 2021/0198082 A1    Jul. 1, 2021

Related U.S. Application Data

(62) Division of application No. 15/804,742, filed on Nov. 6, 2017, now Pat. No. 10,974,929.

(Continued)

(51) Int. Cl.
*B66B 7/06* (2006.01)
*B66B 9/00* (2006.01)
(Continued)

(52) U.S. Cl.
CPC .............. *B66B 7/062* (2013.01); *B29D 29/00* (2013.01); *B66B 9/00* (2013.01); *D07B 1/16* (2013.01); *D07B 1/162* (2013.01); *D07B 5/006* (2015.07); *F16G 1/08* (2013.01); *F16G 1/16* (2013.01); *B29K 2021/003* (2013.01); *B29K 2075/00* (2013.01); *D07B 1/22* (2013.01); *D07B 2205/3007* (2013.01); *D07B 2401/205* (2013.01); *D07B 2501/2007* (2013.01)

(58) Field of Classification Search
CPC ........... B66B 7/062; B66B 9/00; D07B 5/006; D07B 1/16; D07B 1/162; D07B 2501/2007; B29D 20/00; F16G 1/08; F16G 1/16
See application file for complete search history.

(56) References Cited

U.S. PATENT DOCUMENTS 3,111,569 A * 11/1963 Rubenstein ............. B29C 70/86
264/45.2
8,479,887 B2 * 7/2013 Yu ........................... B66B 7/062
187/250

(Continued)

FOREIGN PATENT DOCUMENTS

| CA | 2957352 A1 | 3/2016 |
| CN | 202189591 U | 4/2012 |

(Continued)

OTHER PUBLICATIONS

Brouwers, Sytze, "The importance of retardant conveyors", Dunlop Conveyor Belting, Jan. 16, 2014, Recycling Waste World, 1 page.

(Continued)

*Primary Examiner* — Michael A Riegelman
(74) *Attorney, Agent, or Firm* — Cantor Colburn LLP

(57) ABSTRACT

A belt for an elevator system is provided having a core and an elastomeric sheath positioned over the core. An elastomer and phosphonate blended bonding agent adheres the core to the sheath.

6 Claims, 3 Drawing Sheets

Related U.S. Application Data

(60) Provisional application No. 62/418,403, filed on Nov. 7, 2016.

(51) Int. Cl.
  *B29D 29/00* (2006.01)
  *F16G 1/16* (2006.01)
  *F16G 1/08* (2006.01)
  *D07B 5/00* (2006.01)
  *D07B 1/16* (2006.01)
  B29K 21/00 (2006.01)
  B29K 75/00 (2006.01)
  D07B 1/22 (2006.01)

(56) References Cited

U.S. PATENT DOCUMENTS

| | | | | |
|---|---|---|---|---|
| 8,807,286 B2* | 8/2014 | Puranen | .................. | B66B 7/062 |
| | | | | 73/158 |
| 10,549,952 B2* | 2/2020 | Zhao | .................. | B66B 9/00 |
| 2010/0240482 A1* | 9/2010 | Kanzow | .................... | F16G 5/08 |
| | | | | 474/237 |
| 2011/0259677 A1* | 10/2011 | Dudde | ................... | D07B 1/145 |
| | | | | 187/411 |
| 2012/0329591 A1* | 12/2012 | Goeser | ..................... | F16G 5/20 |
| | | | | 474/264 |
| 2013/0206516 A1* | 8/2013 | Pelto-Huikko | ......... | B66B 7/062 |
| | | | | 264/129 |
| 2014/0017429 A1* | 1/2014 | Kasazaki | ............... | C08L 101/00 |
| | | | | 428/36.4 |
| 2015/0101889 A1* | 4/2015 | Kere | ......................... | B66B 9/00 |
| | | | | 187/254 |
| 2015/0259176 A1* | 9/2015 | Goeser | ..................... | F16G 5/20 |
| | | | | 474/260 |
| 2017/0073195 A1* | 3/2017 | Eastman | ............... | B66B 19/007 |
| 2017/0101293 A1* | 4/2017 | Eastman | ................. | B66B 7/062 |
| 2017/0225925 A1* | 8/2017 | Wesson | .................. | B66B 7/062 |
| 2017/0283220 A1* | 10/2017 | Ding | ........................ | C23C 18/31 |
| 2017/0284503 A1* | 10/2017 | Göser | ..................... | B66B 7/062 |
| 2018/0127239 A1* | 5/2018 | Zafiris | .................... | B66B 7/062 |
| 2018/0127240 A1* | 5/2018 | Zafiris | .................... | B29D 29/00 |
| 2018/0155870 A1* | 6/2018 | Eastman | ................. | B66B 7/062 |
| 2018/0162695 A1* | 6/2018 | Eastman | ................. | B32B 27/36 |
| 2018/0186604 A1* | 7/2018 | Helenius | ............... | D07B 1/005 |
| 2018/0222721 A1* | 8/2018 | Wesson | .................. | D07B 7/145 |
| 2018/0251342 A1* | 9/2018 | Eastman | ................. | D07B 5/006 |
| 2018/0305177 A1* | 10/2018 | Zhao | ........................ | D07B 1/22 |
| 2018/0305178 A1* | 10/2018 | Martin | ................... | D07B 1/162 |
| 2018/0305181 A1* | 10/2018 | Zhao | ........................ | B66B 7/062 |
| 2018/0305549 A1* | 10/2018 | Papas | ..................... | C08L 83/04 |
| 2018/0305866 A1* | 10/2018 | Zhao | ........................ | B66B 7/062 |
| 2019/0062116 A1* | 2/2019 | Zhao | ........................ | F16G 1/16 |
| 2019/0084803 A1* | 3/2019 | Eastman | ................. | D07B 1/162 |
| 2019/0218061 A1* | 7/2019 | Eastman | ................. | D07B 1/16 |
| 2019/0218063 A1* | 7/2019 | Gurvich | ................. | B66B 7/062 |
| 2019/0241401 A1* | 8/2019 | Davis | ..................... | B66B 7/062 |
| 2019/0322488 A1* | 10/2019 | Martin | ................... | B66B 7/062 |
| 2020/0039791 A1* | 2/2020 | Ma | ............................ | F16G 1/10 |

FOREIGN PATENT DOCUMENTS

| | | |
|---|---|---|
| CN | 203250586 U | 10/2013 |
| CN | 104552988 A | 4/2015 |
| CN | 105529059 A | 4/2016 |
| CN | 105802060 A | 7/2016 |
| EP | 2628698 A2 | 8/2013 |
| KR | 101564194 B1 | 10/2015 |
| WO | 2015134023 A1 | 9/2015 |

OTHER PUBLICATIONS

ContiTech AG, "Polyrope Replaces Steel Ropes in Elevators" available at: https://www.contitech.de/Company/News, accessed: Oct. 1, 2018, 43 pages.

Convestro, "Elevator belt in Desmopan", Thermoplastic Polyurethanes Business Unit, Oct. 2, 2018, 2 pages.

\* cited by examiner

-PRIOR ART -

LOAD BEARING MEMBER FOR AN ELEVATOR SYSTEM HAVING AN ELASTOMER AND PHOSPHONATE BLENDED BONDING AGENT

CROSS-REFERENCE TO RELATED APPLICATIONS

This application is a division of U.S. application Ser. No. 15/804,721 filed Nov. 6, 2017, which claims the benefit of U.S. Provisional Application No. 62/418,403 filed Nov. 7, 2016, the disclosures of which are incorporated herein by reference in their entirety.

TECHNICAL FIELD OF THE EMBODIMENTS

Embodiments disclosed herein relate to elevator systems, and more particularly to a load bearing member having an elastomer and phosphonate blended bonding agent for use in an elevator system.

BACKGROUND OF THE EMBODIMENTS

Elevator systems are useful for carrying passengers, cargo, or both, between various levels in a building. Some elevators are traction based and utilize load bearing members such as ropes or belts for supporting the elevator car and achieving the desired movement and positioning of the elevator car.

Where belts are used as a load bearing member, a polyurethane sheath or skin is typically positioned over and adhered to a polymer matrix composite (PMC) core. In at least some belts, poor adhesion between a polyurethane or other elastomer sheath and the polymer matrix composite core, for example carbon fiber/epoxy, of a composite belt remains a challenge even after reactivation, for example plasma, mechanical, or chemical reactivation, of the PMC core to the elastomer sheath extrusion or coating application. Additionally, the fiber/epoxy composite core and the elastomer have poor fire resistance. Fire retardation standards are some of the key safety requirements that each belt is required to meet.

A need remains for a polymer composite belt design that promotes adhesion between the polyurethane sheath/skin and the PMC core, and also improves flame resistance.

SUMMARY OF THE EMBODIMENTS

In one aspect, a belt for an elevator system is provided including a core and a thermoplastic polyurethane (TPU) or other thermoplastic or thermosetting elastomer polymer or rubber sheath positioned over the core. A TPU or other elastomer polymer or rubber and phosphonate blended bonding agent adheres the core to the sheath.

In an aspect of the above, the core is at least one of but not limited to a carbon fiber or aramid fiber or glass fiber thermoset polymer resin composite core, or a carbon fiber or aramid fiber or glass fiber epoxy or polyurethane or bismaleimid or phenolic or polyimide or polyester or silicone thermoset polymer resin composite core, or mixtures and blends thereof.

In an aspect of any of the above, the TPU or elastomer or rubber and phosphonate blended bonding agent includes at least one of but not limited to a poly-phosphonate homopolymer, phosphonate oligomer, phosphonate carbonate co-oligomer, poly-phosphonate-polycarbonate copolymer, phosphonate ester co-oligomer, and poly-phosphonate-polyester copolymer and blends thereof.

In an aspect of any of the above, the at least one of but not limited to poly-phosphonate homopolymer, phosphonate oligomer, phosphonate carbonate co-oligomer, poly-phosphonate-polycarbonate copolymer, phosphonate ester co-oligomer, and poly-phosphonate-polyester copolymer are blended in a weight within a range of 1% to 30% in an embodiment, within a range of 3% to 30% in another embodiment, and within a range of 0.5% and 50% in another embodiment.

In an aspect of any of the above, the TPU or elastomer or rubber and phosphonate blended bonding agent is formed as a tie-layer positioned between the core and the sheath.

In an aspect of any of the above, the tie-layer is extruded onto the core, and the sheath is extruded onto the tie-layer.

In an aspect of any of the above, at least one of the TPU, or elastomer, or rubber, or phosphonate blended bonding agent is mixed with a resin that forms at least one of the core and the sheath.

In one aspect, an elevator system is provided having an elevator car and a counterweight. A belt couples the elevator car to the counterweight. The belt includes a core and a thermoplastic polyurethane (TPU) or thermoplastic or thermosetting elastomer polymer or rubber sheath positioned over the core. A TPU or elastomer or rubber and phosphonate blended bonding agent adheres the core to the sheath.

In an aspect of the above, the core is at least one of but not limited to a carbon fiber or aramid fiber or glass fiber thermoset polymer resin composite core or a carbon fiber or aramid fiber or glass fiber epoxy or polyurethane or bismaleimid or phenolic or polyimide or polyester or silicone thermoset polymer resin composite core, or mixtures and blends thereof.

In an aspect of any of the above, the TPU or elastomer or rubber and phosphonate blended bonding agent includes at least one of but not limited to poly-phosphonate homopolymer, phosphonate oligomer, phosphonate carbonate co-oligomer, poly-phosphonate-polycarbonate copolymer, phosphonate ester co-oligomer, and poly-phosphonate-polyester copolymer and blends thereof.

In an aspect of any of the above, the at least one of but not limited to poly-phosphonate homopolymer, phosphonate oligomer, phosphonate carbonate co-oligomer, poly-phosphonate-polycarbonate copolymer, phosphonate ester co-oligomer, and poly-phosphonate-polyester copolymer are blended in a weight within a range of 1% to 30% in an embodiment, within a range of 3% to 30% in another embodiment, and within a range of 0.5% and 50% in another embodiment.

In an aspect of any of the above, the TPU or elastomer or rubber and phosphonate blended bonding agent is formed as a tie-layer positioned between the core and the sheath.

In an aspect of any of the above, the tie-layer is extruded onto the core, and the sheath is extruded onto the tie-layer.

In an aspect of any of the above, at least one of the TPU, or elastomer, or rubber, or phosphonate blended bonding agent is mixed with a resin that forms at least one of the core or the sheath.

In one aspect, a method of forming a belt for an elevator system is provided. The method includes providing a core and positioning a thermoplastic polyurethane (TPU) or other thermoplastic or thermosetting elastomer polymer or rubber sheath over the core. The method also includes adhering the core to the sheath with a TPU or elastomer or rubber and phosphonate blended bonding agent.

In an aspect of the above, the method includes providing a core includes providing at least one of but not limited to a carbon fiber or aramid fiber or glass fiber thermoset polymer resin composite core, or a carbon fiber or aramid fiber or glass fiber epoxy or polyurethane or bis-maleimid or phenolic or polyimide or polyester or silicone thermoset polymer resin composite core, or mixtures and blends thereof.

In an aspect of any of the above, the TPU or elastomer or rubber and phosphonate blended bonding agent includes at least one of but not limited to poly-phosphonate homopolymer, phosphonate oligomer, phosphonate carbonate co-oligomer, poly-phosphonate-polycarbonate copolymer, phosphonate ester co-oligomer and poly-phosphonate-polyester copolymer, and blends thereof.

In an aspect of any of the above, the method includes blending the at least one of but not limited to poly-phosphonate homopolymer, phosphonate oligomer, phosphonate carbonate co-oligomer, and poly-phosphonate-polycarbonate copolymer, phosphonate ester co-oligomer and poly-phosphonate-polyester copolymer in a weight within a range of 1% to 30% in an embodiment, within a range of 3% to 30% in another embodiment, and within a range of 0.5% and 50% in another embodiment.

In an aspect of any of the above, the method includes forming the TPU or elastomer or rubber and phosphonate blended bonding agent as a tie-layer positioned between the core and the sheath.

In an aspect of any of the above, the method includes mixing at least one of the TPU, or elastomer or rubber, or phosphonate blended bonding agent with a resin that forms the core, and mixing at least one of the TPU, or elastomer, or rubber, or phosphonate blended bonding agent with a resin that forms the sheath.

DETAILED DESCRIPTION OF THE DRAWINGS

Figure 1:
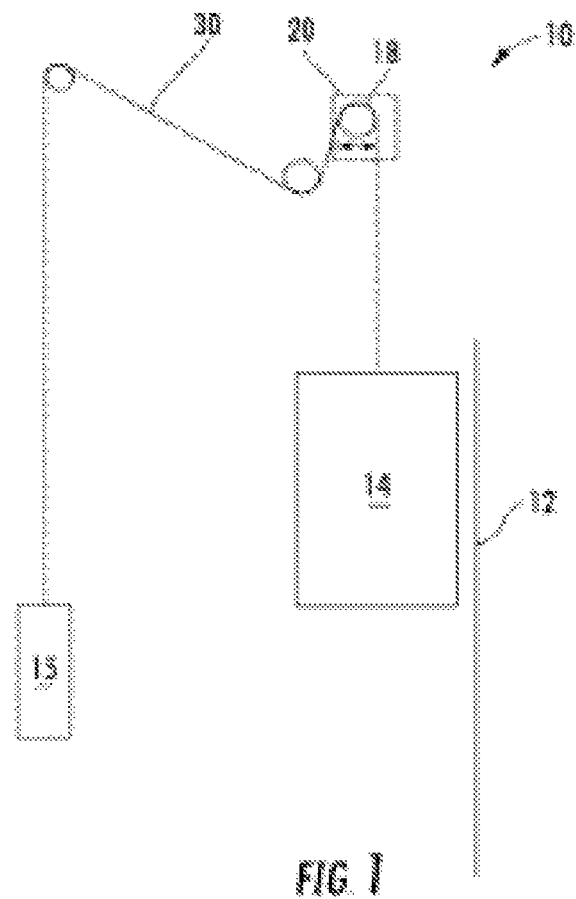
FIG. 1 is a perspective view of an example of a traction elevator system.

Referring now to FIG. 1, an exemplary embodiment of an elevator system 10 is illustrated. The elevator system 10 includes an elevator car 14 configured to move vertically upwardly and downwardly within a hoistway 12 along a plurality of car guide rails (not shown). Guide assemblies mounted to the top and bottom of the elevator car 14 are configured to engage the car guide rails to maintain proper alignment of the elevator car 14 as it moves within the hoistway 12.

The elevator system 10 also includes a counterweight 15 configured to move vertically upwardly and downwardly within the hoistway 12. The counterweight 15 moves in a direction generally opposite the movement of the elevator car 14. Movement of the counterweight 15 is guided by counterweight guide rails (not shown) mounted within the hoistway 12. In the illustrated, non-limiting embodiment, at least one load bearing member 30, for example, a belt, coupled to both the elevator car 14 and the counterweight 15 cooperates with a traction sheave 18 mounted to a drive machine 20. To cooperate with the traction sheave 18, at least one load bearing member 30 bends in a first direction about the traction sheave 18. Although the elevator system 10 illustrated and described herein has a 1:1 roping configuration, elevator systems 10 having other roping configurations and hoistway layouts are within the scope of the present disclosure.

Figure 2:
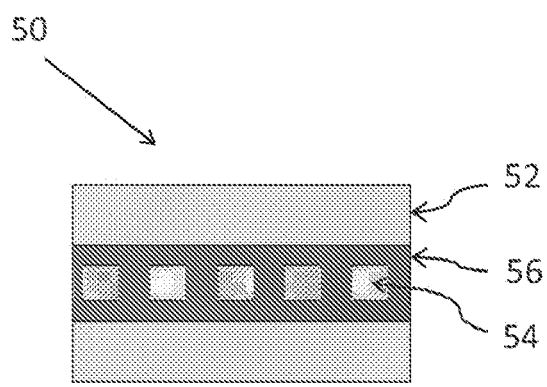
FIG. 2 is a cross-sectional view of an exemplary embodiment of a belt for an elevator system.

FIG. 2 illustrates a composite belt 50 including a polyurethane or elastomer or rubber sheath or skin 52. In one embodiment, the polyurethane sheath 52 is an extruded thermoplastic polyurethane (TPU) sheath. The belt 50 also includes a polymer matrix composite core 54, for example, a carbon fiber/epoxy thermoset resin composite core. A coated or co-extruded adhesive tie-layer 56 is provided between the sheath 52 and the core 54. In one embodiment, the adhesive tie-layer 56 includes a polymer blend of a TPU or elastomer or rubber and at least one of a poly-phosphonate homopolymer, phosphonate oligomer, phosphonate carbonate co-oligomer, poly-phosphonate-polycarbonate copolymer, phosphonate ester co-oligomer, poly-phosphonate-polyester copolymer or a combination thereof.

Figure 4:
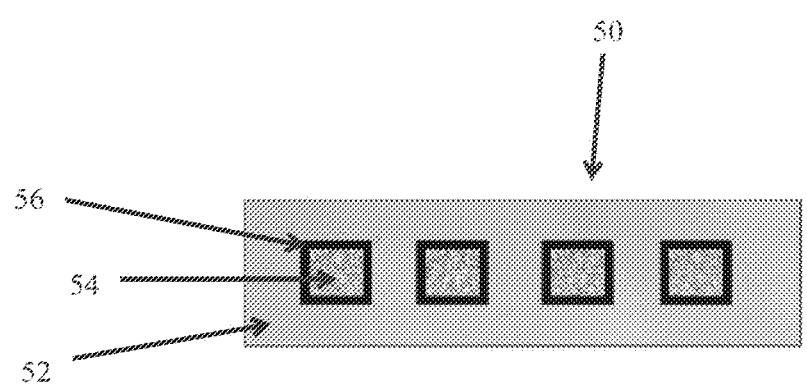
FIG. 4 is a cross-sectional view of an exemplary embodiment of a belt for an elevator system.

Referring now to FIG. 4, in an embodiment of the belt 50, the adhesive tie-layer 56 includes one or more layers that are fully internal to the sheath 52. The adhesive tie-layer 56 at least partially surrounds and/or encapsulated one or more sections of the core 54 as illustrated. The embodiment of FIG. 4 allows the sheath 52 to be positioned between one or more pultrusions in an embodiment, explained in further detail below, of the tie-layer 56.

The core 54 of one or more embodiments is constructed of a structural component and a binder to form a monolithic tension element. The structural component can be carbon fiber, aramid fiber, glass fiber, and/or other materials with sufficiently high specific tensile strength. In an embodiment, a fiber alignment of the structural material is substantially parallel. The fiber alignment is at least 90% aligned in the length direction in an embodiment and at least 95% aligned in the length direction in another embodiment. The binder or material that holds the structural component together is constructed of a thermosetting material in an embodiment, such as epoxy, polyurethane, bis-maleimid, phololic, polyimide, or silicone material or a thermoplastic material to name non-limiting examples. Additional components/materials are added to the thermoset material in an embodiment to improve bonding and other features of the core material. In one non-limiting example, one or more phosphonate oligomer or polymers are added to the binder or material that holds the structural component together at a concentration of between 0.1% and 10%.

The core 54 of one or more embodiments has any cross sectional geometry including, circular, oval, hexagonal or quadrilateral to name non-limiting examples. In an embodiment, the cross sectional geometry of the core 54 is a quadrilateral with an aspect ratio greater than one, i.e., rectangular, where its long axis is parallel to the traction surface. The thickness of the core 54 in an embodiment is between 0.3 mm and 30 mm and, in another embodiment, is between 1 mm and 15 mm. In embodiments having a quadrilateral geometry, the thickness of the core 54 is between 0.3 mm and 5.0 mm and the width of the core 54 is between 0.3 mm and 15 mm. In embodiments having a rounded geometry, such as circular and ovoid geometries to name two non-limiting examples, a radius is between 0.3 mm and 15 mm in an embodiment and between 5.0 mm and 15 mm in another embodiment.

In one embodiment, the phosphonate containing oligomers and polymers form miscible blends with TPU or elastomer or rubber polymers as well as with epoxy thermoset resins. Accordingly, in one embodiment, the adhesive tie-layer 56 has chemical affinity to both the sheath 52 and the core 54, and can therefore act as an adhesive tie-layer between the sheath and the core material. The phosphonate oligomers and polymers are flame retardant (FR) additives for TPUs or elastomers or rubbers and epoxy resins in low loading levels (2% to 30% wt by way of non-limiting example and 0.5% to 50% wt by way of another non-limiting example) and can be blended into the respective polymers to form a sheathed composite belt with improved fire resistance.

The TPU or thermoplastic elastomer or thermoplastic rubber/phosphonate oligomer polymer blends are melt extrudable. Accordingly, the tie-layer 56 and the sheath 52 can be extruded or co-extruded or extrusion coated or co-extrusion coated onto the composite belt core 54. Alternatively the tie-layer 56 can be applied as a solvent-borne coating onto the belt core 54 by running the belt 50 through a bath or through other on-line coating applicators, for example a flooded rolls nip, a metered roll application, etc. The sheath 52 can then be extruded onto the tie-layer coated belt core 54. In one embodiment, the belt 50 may enable the use of the same or other FR additives in the TPU or elastomer or rubber sheath 52 and core 54 as may be necessary for improved belt properties, for example traction/slip, flex, wear, etc.

In one or more embodiments, the tie-layer 56 is extruded onto the belt core 54. In an embodiment, the sheath 52 is extruded onto the tie-layer 56. In an embodiment, the sheath 52 is extruded onto the core 54.

In one or more embodiments, the tie-layer 56 is applied by pultrusion onto the belt core 54. In an embodiment, the sheath 52 is applied by pultrusion onto the tie-layer 56. In an embodiment, the sheath 52 is applied by pultrusion onto the core 54.

Figure 3:
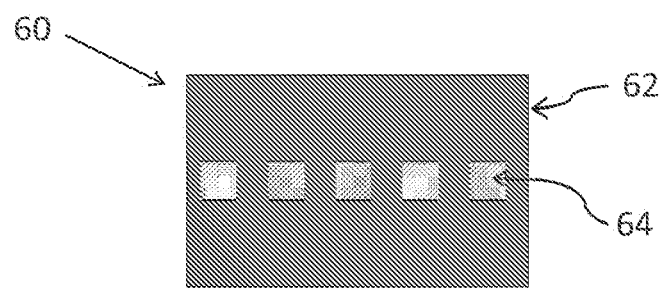
FIG. 3 is a cross-sectional view of an exemplary embodiment of a belt for an elevator system.

In an alternative embodiment, illustrated in FIG. 3, a belt 60 includes phosphonate oligomer or polymers that are added to at least one of a sheath 62 and a core 64 for adhesive compatibility and FR. For example at least one of the TPU, or elastomer, or rubber, or phosphonate blended bonding agent may be mixed with a resin that forms the core. Alternatively, at least one of the TPU or elastomer, or rubber, or phosphonate blended bonding agent may be mixed with a resin that forms the sheath. In one embodiment, at least one of the TPU, or elastomer, or rubber, or phosphonate blended bonding agent is mixed with a resin that forms the core and a resin that forms the sheath.

In an embodiment, the sheath 62 is extruded onto the core 64. The sheath 62 of an embodiment includes a thermosetting elastomer or rubber polymer blended with polyphosphonates bonding additive polymers or oligomers. The sheath 62 of an embodiment is applied by pultrusion onto the preformed core 64. The core 64 is formed by pultrusion in an embodiment. The polyphosphonate bonding additives are included in a resin of the core(s) 64 in one or more embodiments.

In one embodiment, the adhesion between the sheath 52, 62 and a core 54, 64 may improve fire resistance performance of the respective belt 50, 60. In one embodiment, the fire resistance performance of the resulting belt may be improved without the use of halogens or other substances that are not recommended for building applications. Additionally, the oligomeric additives may not embrittle or substantially deteriorate the mechanical properties of the elastomer or the epoxy. In one embodiment, the additives may toughen the resulting material or be employed as the cross-linker or hardening agent in urethanes and epoxies, respectively.

The disclosed invention provides a polymer composite belt design that promotes adhesion between the polyurethane sheath/skin and the PMC core, and also improves flame resistance.

What is claimed is:

1. A method of forming a belt for an elevator system, the method comprising:
   providing a core;
   positioning an elastomeric sheath over the core; and
   adhering the core to the sheath with an elastomer and phosphonate blended bonding agent;
   wherein the elastomer and phosphate blended bonding agent is mixed with a same resin that forms at least one of the core and the sheath.

2. The method of claim 1, wherein providing a core includes providing at least one of a carbon fiber thermoset resin composite core, an aramid fiber thermoset resin composite core, a glass fiber thermoset resin composite core, an epoxy thermoset resin composite core, and combinations thereof.

3. The method of claim 1, wherein the elastomer and phosphonate blended bonding agent includes at least one of poly-phosphonate homopolymer, phosphonate oligomer, phosphonate carbonate co-oligomer, poly-phosphonate-polycarbonate copolymer, phosphonate ester co-oligomer, poly-phosphonate-polyester copolymer, and blends thereof.

4. The method of claim 3 further comprising blending the at least one of poly- phosphonate homopolymer, phosphonate oligomer, phosphonate carbonate co-oligomer, poly-phosphonate-polycarbonate copolymer, phosphonate ester co-oligomer, and poly-phosphonate- polyester copolymer in a weight within a range of 0.5% to 50%.

5. The method of claim 1 further comprising forming the elastomer and phosphonate blended bonding agent as a tie-layer positioned between the core and the sheath.

6. The method of claim 1 further comprising at least one of:
   mixing the elastomer and phosphonate blended bonding agent with a resin that forms the core; and
   mixing the elastomer and phosphonate blended bonding agent with a resin that forms the sheath.

* * * * *